Figure 3:
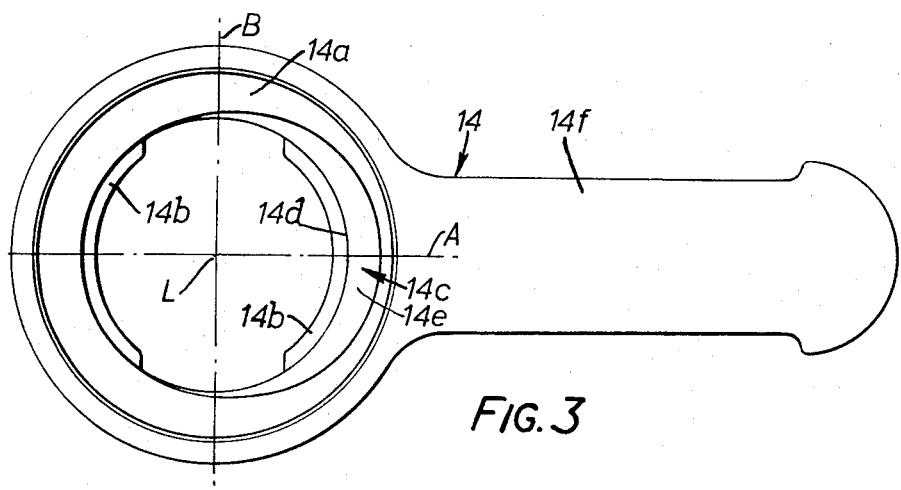

United States Patent
Pearce

[15] 3,697,032
[45] Oct. 10, 1972

[54] SCAFFOLDING
[72] Inventor: Douglas Henry Pearce, Berkhampsted, England
[73] Assignee: Access Equipment Limited, Hemel Hempstead, England
[22] Filed: Dec. 15, 1969
[21] Appl. No.: 884,969

[30] Foreign Application Priority Data
Dec. 19, 1968 Great Britain..........60,413/68

[52] U.S. Cl. .............248/188.4, 182/201, 248/354 S
[51] Int. Cl. ..............................................E06f 7/28
[58] Field of Search........248/354 S, 188.4, 405, 406; 24/263 A, 263 DB; 85/33; 182/200, 201, 204; 108/144, 147

[56] References Cited
UNITED STATES PATENTS
2,618,496  11/1952  Johnson..............248/188.4 X
3,224,800  12/1965  Fisher...........................287/62

FOREIGN PATENTS OR APPLICATIONS
1,113,993  4/1956  France..........................85/33
439,680  12/1967  Switzerland.................287/62

*Primary Examiner*—J. Franklin Foss
*Attorney*—Norris and Bateman

[57] ABSTRACT

A leg of adjustable length, for scaffolding, has an externally screw threaded leg member slidably received in an upright tubular scaffolding member the lower end of which abuts a nut on the leg member rotatable to provide fine adjustment of the leg length. The nut has a lever arm and is tiltable to disengage its screw threads from the screw threads of the leg member to provide for coarse adjustment of the leg length. The tubular scaffold member normally seats in a recess in the nut to prevent tilting of the nut.

9 Claims, 6 Drawing Figures

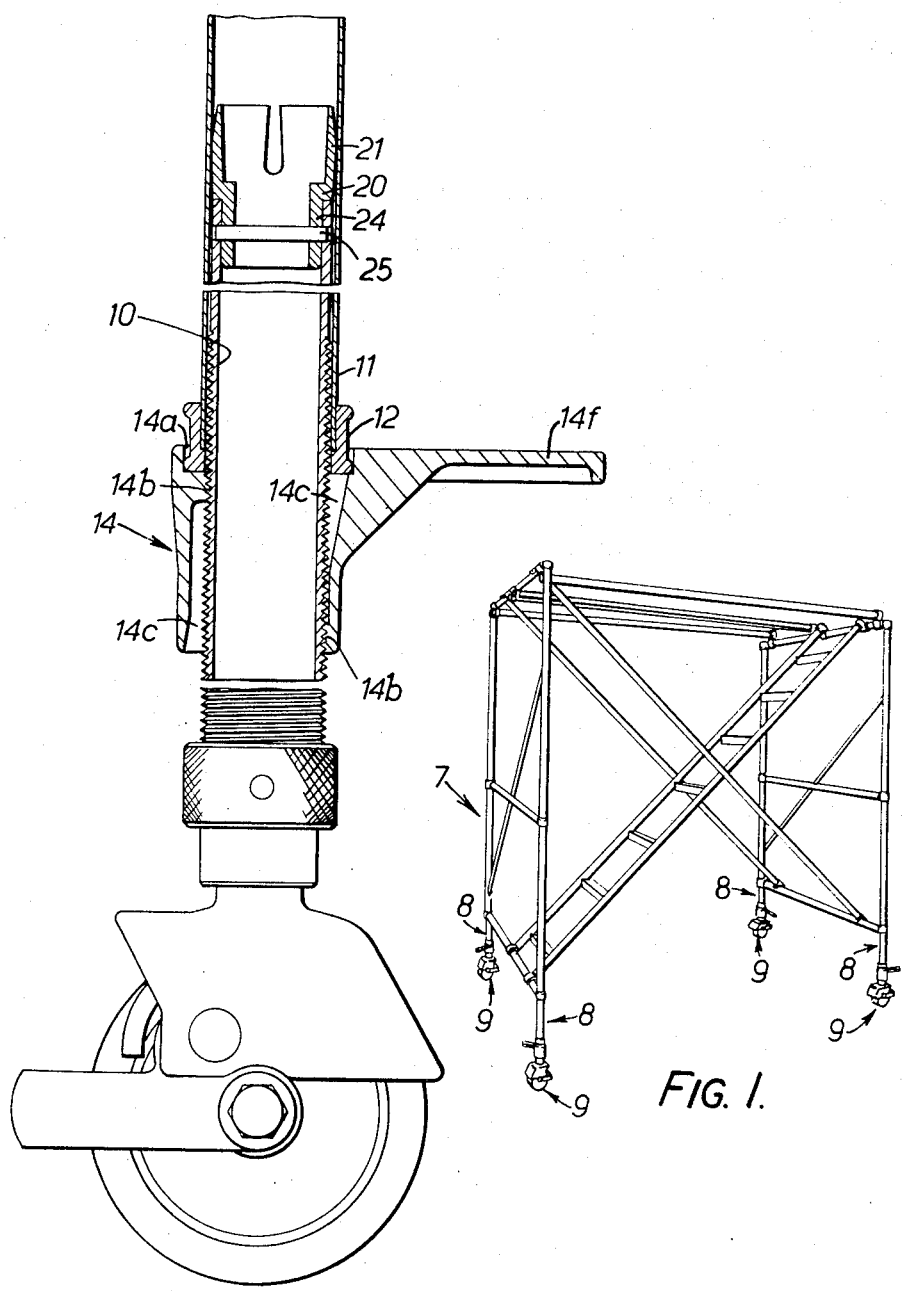

SCAFFOLDING

This invention relates to scaffolding or the like, for example lightweight, portable scaffolding, otherwise termed staging, and concerns adjustable legs for same permitting the scaffolding or the like to be adjusted to stand vertically on unlevel ground.

In our British Pat. No. 1,079,653 there is described an adjustable leg for scaffolding or the like comprising an externally screw threaded leg member and a nut member on the leg member having a screw threaded segment or quarter nut pivoted thereto, the quarter nut being normally spring pressed into engagement with the screw thread on the leg member to provide for fine screw adjustment of the nut member along the leg member but pivotable against the spring force to disengage the screw threads on the leg member and the quarter nut respectively, thereby to permit coarse adjustment of the nut member along the leg member.

The leg member is received in a bore in a further member which abuts the nut member and which, in the case of British Pat. No. 1,079,653, is a tubular scaffolding member, the nut member being adjustable on the leg member to adjust the length of the leg member projecting downwardly from the tubular scaffolding member, and hence, the effective length of the leg member.

The load on the tubular scaffolding member is transmitted to the leg member through the nut member and the quarter nut. As the load on the tubular scaffolding member increases, the effort required to turn the nut member to provide fine, screw adjustment of the leg length also increases.

Because the quarter nut pivots relative to the nut member into and out of engagement with the screw thread on the leg member, the quarter nut does not readily take up an accurate position in which its threads properly engage the thread on the leg member even although the nut member is itself held in an accurate position by its engagement with the tubular scaffolding member. If the quarter nut is not accurately positioned the nut member becomes even more difficult to rotate under heavy load.

The object of the invention is to provide an improved form of adjustable leg for scaffolding or the like which permits of both fine adjustment and coarse adjustment on the leg length.

According to the invention the nut member is in one piece and is tiltable as a whole, relative to the leg member, to disengage the screw threads on the leg member and the nut member respectively.

The screw threads on the nut member are thus held in an accurate position with respect to the screw thread on the leg member because the nut member is itself held, in an accurate position and the nut member is far easier to adjust under heavy load. Also, since the nut member is made in one place, it is far cheaper to manufacture.

Figure 5:
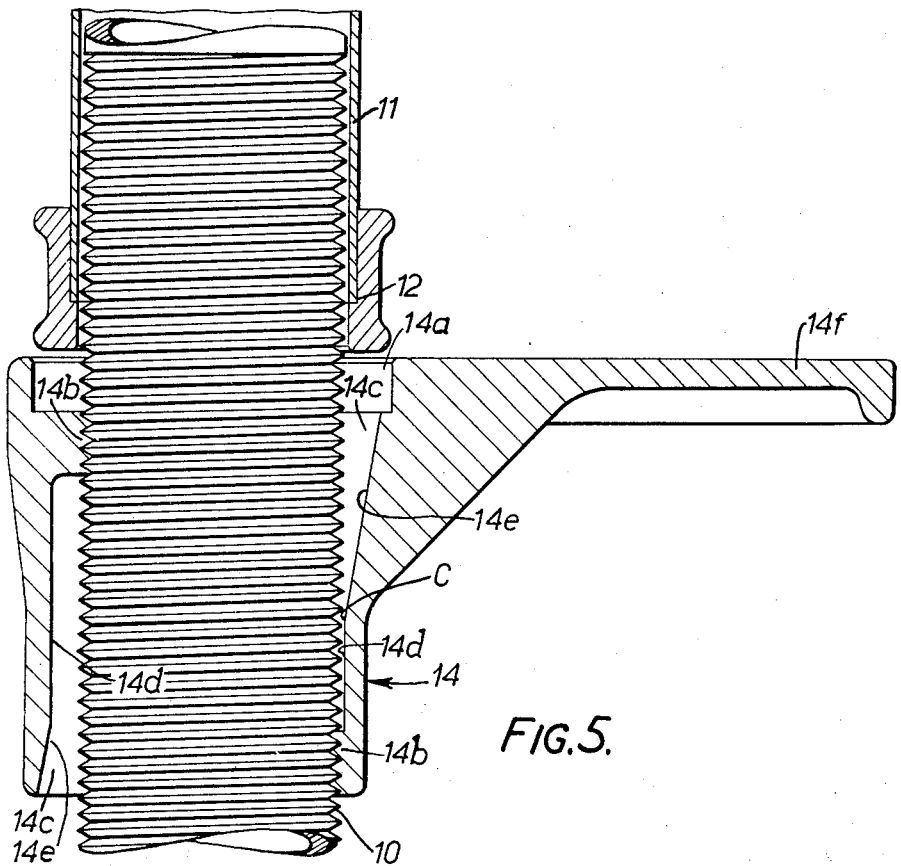
Figure 4:
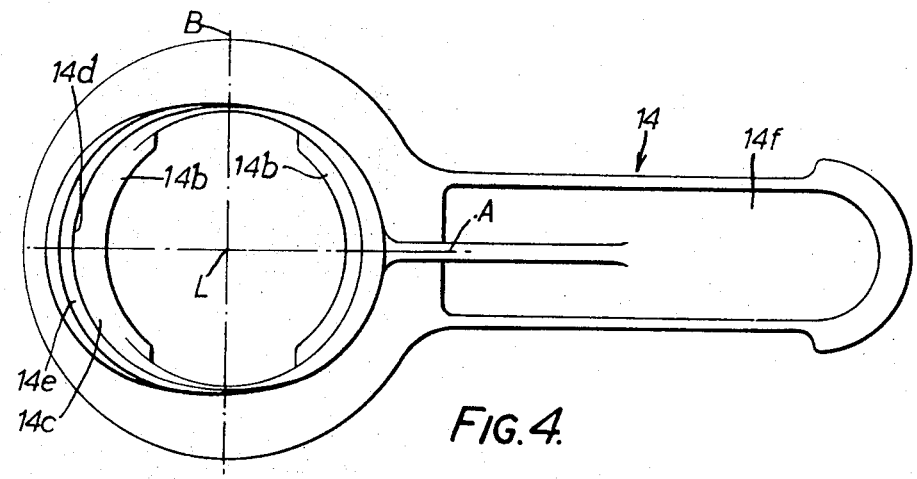
Figure 6:
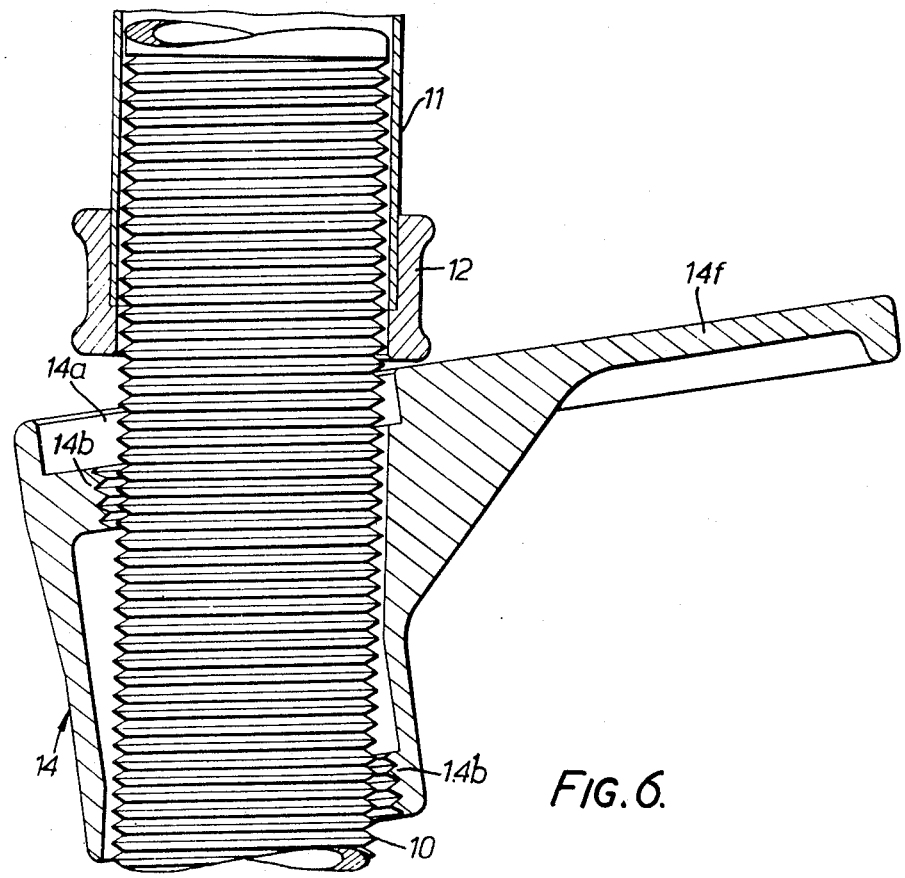

These and other advantages of the present invention will become clear from the following description of one specific embodiment thereof given by way of example with reference to the accompanying drawings in which:

FIG. 1 is a perspective view of a light-weight portable scaffolding according to this invention having adjustable legs according to this invention, FIG. 2 is a side elevation, partly in section, of one of the adjustable legs, FIG. 3 is a top plan of part of the leg shown in FIG. 2, FIG. 4 is an underneath plan of the part shown in FIG. 3, and FIGS. 5 and 6 are views corresponding with FIG. 2 and showing stages in the adjustment of the leg.

Referring to the drawings, the scaffolding generally indicated at 7 in FIG. 1 is provided with four adjustable legs 8, one at each corner, and each having a castor wheel 9 at its lower end. Referring to FIG. 2, each adjustable leg comprises an externally screw threaded, vertically disposed leg member 10 which is freely received in the lower end of a vertically disposed, tubular scaffold member 11 so as to be movable into and out of the member 11 thereby to adjust the length of the leg. The member 11 has an external collar 12 welded thereto at its lower end.

The collar 12 abuts, and seats in a recess in, a nut member generally indicated at 14.

The recess referred to is indicated at 14a and the load of the member 11 normally holds the collar 12 seated in the recess 14a.

The nut member 14 is carried by, so as to be mounted on, the leg member 10 and has internal screw thread portions 14b normally in engagement with the external screw thread on the member 10.

Rotation of the nut member 14 on the leg member 10 (or rotation of the leg member 10 in the nut member 14) with the screw thread portions 14b in engagement with the external screw thread on the member 10 brings about a fine screw adjustment of leg length, the member 10 moving into or out of the member 11, depending on the direction of relative rotation of the leg member 10 and the nut member 14.

The screw threaded portions 14b are oppositely disposed and axially offset in the bore of the nut member and, in the present example, each extends over an angle of about 90° only in the bore. However, the portions 14b could extend up to 180° or their angle of extent could be less than 90°. The screw thread portions 14b upstand in the bore of the nut member. Opposite each portion 14b the bore is enlarged asymmetrically, at 14c so as to present conjoining straight and tapering wall portions 14d and 14e. The straight wall portions 14d extend in the direction of the longitudinal axis L of the nut member and are spaced a maximum distance from the axis L in the plane A containing the axis L and bisecting the threaded portions 14b this distance progressively decreasing to a minimum in the plane B containing the axis L and extending at right angles to the plane A. The inclination of the tapering wall portions 14e which with respect to the axis L is at a maximum in the plane A and progressively decreases to zero in the plane B through the axis of the nut member at right angles to the plane A. The inclination of the wall portions 14e is furthermore such that when these wall portions are brought parallel to the external threaded surface of the leg member 10 as shown in FIG. 6, the thread portions 14b become disengaged from the external thread of the leg member 10 and the nut member 14 is freed to move lengthwise along the leg member without rotation.

The wall portions 14e lie in a common cylindrical surface of a diameter a little greater than the leg member 10, which surface is centered on the long axis of the leg member 10 when the nut member 14 is in the tilted position shown in FIG. 6. When the nut member is freed for coarse adjustment along the leg member the wall portions 14e lie flat against the crests of the screw threads and assist in guiding the nut member with respect to the leg member.

A radially outwardly projecting lever arm 14f is provided on the nut member extending generally in the plane A. The lever arm 14f is disposed on the opposite side of the nut member 14 to the screw thread portion 14b which lies nearer the upper end of the nut member. This arrangement of the lever arm 14f ensures that the lever arm must be swung upwardly in order to tilt the nut member to disengage the screw thread portions on the nut member and the external thread of the leg member. When the lever arm 14f is swung upwardly the nut member is tilted with respect to the leg member on a fulcrum C presented by the line of intersection of the wall portions 14d and 14e of the bore of the nut member on the same side of the nut member as the lever arm.

The collar 12, seating in the recess 14a, normally prevents tilting of the nut member. The load of the tubular member 11 is then transferred to the nut member and through the screw thread portions 14b to the leg member 10 and then through the leg member to the ground.

The upper end of the leg member may be slotted axially to provide a slightly outwardly inclined spring finger which engages the inside of the tubular member 11 to prevent the leg member falling out of the tubular member if the adjustable leg is lifted from off the ground. The spring finger, however, readily allows the leg member to be pushed into or pulled out of the tubular member by means of an applied load.

Preferably however, the upper end of the leg member carries, pinned thereto, an inverted skirt member 20 of plastics material presenting out springing petals 21 which together make up the skirt, the skirt member having a part 24 received within the leg member and receiving the pin 25. The petals 21 are of double tapered form and converge towards their upper end whereby the leg member 10 is readily inserted in the tubular member 11.

If the leg member is held against rotation by an operator the nut member 14 may be screwed down by the operator using the arm 14f to disengage the collar 12 from the recess 14a. This is shown in FIG. 5. The nut member may then be tilted as shown in FIG. 6 to free the leg member 10 for coarse adjustment into and out of tubular member 11.

Alternatively, if the load of the leg member is supported by the operator gripping the tubular member 11 and lifting same the leg member may be pulled axially out of the tubular member to disengage the collar 12 from the recess 14a. However, the leg member cannot be moved in this way by means of the arm 14f because the leg member 10 then tends to tilt and jam in the tubular member 11. This provides a safety feature if one leg of a staging should leave contact with the ground for any reason. In that event, the leg member is not readily accidentally displaced relative to the tubular member to free the collar 12 from the recess 14a thus allowing the nut member to tilt and disengage its threads from the threads of the leg member because the member 20 exerts a sufficient grip inside the tubular member 11 to support the weight of the nut member 14, the leg member 10 and the castor.

Because the lever arm 14f has to be swung upwardly to free the nut member, the nut member cannot be freed accidentally by a person standing on the lever arm.

It is to be understood that the recess 14a is not absolutely essential and the collar 12 could abut directly on the upper end of the nut member 14. The function of the recess 14a is to cooperate with the collar 12 to lock the nut member against tilting.

The nut member 14 is preferably formed as a one piece casting.

It will be appreciated that the present invention is not limited to scaffolding and that an adjustable leg as hereinbefore described and as claimed in the following claims has many other uses and may also be used for jacking, propping and shoring purposes.

I claim:

1. In adjustable leg scaffolding or the like, a generally vertical tubular scaffold member, a leg member projecting freely upwardly into said scaffold member and having a threaded section, and a one piece nut member on said threaded section normally having relatively rotatable load bearing support engagement with said tubular member, said nut member having an internal bore formed with screw threads engaging the threaded section of the leg for relative rotational adjustment between the nut member and the leg member when the axis of the bore is coincident with the axis of said leg member, and said bore being further formed to permit tilting of the axis of said nut member relative to the axis of the leg member to disengage the threads of the nut member from said threaded section of the leg member and provide substantially free relative longitudinal sliding movement between said nut and leg members and means including cooperating formations within said bore permitting tilting of said nut in only a predetermined direction about an axis transverse to said leg member for effecting said thread disengagement, said direction being opposite to the direction of force applied by the load at said load bearing surface, said screw threads on the nut being vertically spaced threaded sectors at opposite sides of said bore.

2. In adjustable leg scaffolding as claimed in claim 1 wherein said screw thread sectors each extend over an angle of about 90°.

3. In adjustable leg scaffolding as claimed in claim 1 wherein said screw thread sectors upstand in the bore of the nut member and the bore of the nut member is enlarged assymetrically opposite each of said screw thread sectors so as to present a tapering wall portion having an inclination with respect to the longitudinal axis of the nut member which is a maximum in a first plane containing said longitudinal axis and bisecting said screw thread sectors and which progressively decreases in axial planes, on each side of said first plane so as to become zero in a second plane containing said longitudinal axis and extending at right angles to said first plane, said tapering wall portions lying in a common cylindrical surface of a diameter greater than the leg member threaded section, which surface is centered on the longitudinal axis of the leg member when the nut member is in the tilted position in which the screw threads on the leg member and the nut member respectively are disengaged.

4. In adjustable leg scaffolding as claimed in claim 3 wherein each of said tapering wall portions conjoins with a straight wall portion of the bore of the nut member which is disposed between one of said screw thread sectors and one of said tapering wall portions, the straight wall portions extending in the direction of the longitudinal axis of the nut member and being spaced a maximum distance from said longitudinal axis in said first plane and a minimum distance from said longitudinal axis in said second plane.

5. In adjustable leg scaffolding as claimed in claim 3 wherein the nut member has a radially outwardly projecting lever arm for tilting and rotating same, the lever arm extending generally in said first plane.

6. In adjustable leg scaffolding as claimed in claim 5 wherein the lever arm is on the opposite side of the nut member to that one of said screw thread sectors nearer the upper end of said leg member.

7. An adjustable leg scaffolding as claimed in claim 1 further characterized in that said tubular member is arranged to seat in an upwardly open recess in the nut member and the tubular member co-operates with the recess to prevent tilting of the nut member while entered therein.

8. Adjustable leg scaffolding as defined in claim 1, wherein said nut member has a projecting operating arm and said nut bore is enlarged opposite said threaded sectors so that said threaded sectors may be disengaged from the threaded section of said leg only when said nut member is tilted by upward movement of said arm.

9. An adjustable leg scaffolding or the like as defined in claim 1 wherein a rigid lever arm projects laterally from the upper portion of said nut and the upper of said vertically spaced threaded sectors in disposed on the opposite side from said arm.

* * * * *